United States Patent
Russo et al.

(10) Patent No.: US 7,224,845 B1
(45) Date of Patent: May 29, 2007

(54) BIJECTION MAPPING FOR COMPRESSION/DENOISING OF MULTI-FRAME IMAGES

(75) Inventors: Leonard E. Russo, Nashua, NH (US); Jose L. Paredes, Edo Merida (VE); Gonzalo R. Arce, Newark, DE (US)

(73) Assignee: BAE Systems Information And Electric Systems Integration Inc., Nashua, NH (US)

( * ) Notice: Subject to any disclaimer, the term of this patent is extended or adjusted under 35 U.S.C. 154(b) by 833 days.

(21) Appl. No.: 10/376,491

(22) Filed: Feb. 28, 2003

Related U.S. Application Data (60) Provisional application No. 60/360,457, filed on Feb. 28, 2002.

(51) Int. Cl.
*G06K 9/46* (2006.01)
*G06K 9/00* (2006.01)

(52) U.S. Cl. .................................................. 382/240
(58) Field of Classification Search ................ 382/162, 382/166, 232, 233, 235, 239, 240, 243, 252, 382/253; 375/240.01, 240.08, 240.16, 240.19, 375/240.21, 240.27, 240.29; 707/3
See application file for complete search history.

(56) References Cited

U.S. PATENT DOCUMENTS

| | | | | |
|---|---|---|---|---|
| 5,737,448 A | * | 4/1998 | Gardos | 382/240 |
| 5,963,935 A | * | 10/1999 | Ozbutun et al. | 707/3 |
| 6,081,800 A | * | 6/2000 | Ozbutun et al. | 707/3 |
| 6,879,716 B1 | * | 4/2005 | Ishibashi | 382/166 |
| 7,035,457 B2 | * | 4/2006 | Ishibashi | 382/166 |

OTHER PUBLICATIONS

Segall, Adrian, Bit Allocation And Encoding For Vector Sources, Mar. 1976; p. 162-169; IEEE Transactions On Information Theory.
Abouslemann, et al., Compression Of Hyperspectral Imagery Using The 3D DCT And Hybrid DPCM.DCT; Jan. 1995; p. 26-34; IEEE Transactions On Geoscience And Remote Sensing, vol. 33. No. 1.
Bilgin, et al.; Three-dimensional Image Compression With Integer Wavelet Transforms; Apr. 2000, vol. 39, No. 11; Applied Optics; p. 1799-1814.

(Continued)

*Primary Examiner*—Amir Alavi
(74) *Attorney, Agent, or Firm*—Robert K. Tendler; Daniel J. Long (57) ABSTRACT

A new approach to multispectral image compression where the intra- and cross-band correlations are jointly exploited in a surprisingly simple yet very effective manner. The key component of the algorithm is a bijection mapping of the original multispectral image into a virtual 2 dimensional scalar image. By optimally mapping the multispectral image set into a single 2 dimensional array and by subsequently applying a scalar image coding algorithm, the spatial correlation and the spectral correlation of the multispectral data set are jointly exploited. Based on the statistical characteristics of the multispectral data, the bijection mapping can be optimized to minimize the distortion introduced by the compression algorithm. The optimization reduces to the maximization of a function of the second-order statistics of the multispectral data. At high compression rates, the new algorithm outperforms traditional compression algorithms whenever the cross-band correlation is high and it yields comparable performance at low compression rates.

20 Claims, 9 Drawing Sheets

OTHER PUBLICATIONS

"Multichannel Image Compression by Bijection Mappings Onto Zero-Trees," Paredes, Jose L;; Arce, Gonzalo R.; Russo, Leonard E., ICIP2000: Proceedings 2000 International.

Conference on Image Processing, vol. 3, Sep. 10-13, 2000, pp. 648-651 vol. 3.

Saghri, et al., Practical Transform Coding Of Multispectral Imagery; Jan. 1995; p. 32-43; IEEE Signal Processing Magazine.

Tretter, et al., Optimal Transforms For Multispectral And Multilayer Image Coding; Mar. 1995; p. 296-308; IEEE Transactions On Image Processing, vol. 4 No. 3.

Bradley, et al.; Spectrum Analysis Of Multispectral Imagery In Conjunction With Wavelet/KLT Data Compression; 1993; IEEE; p. 26-30.

Vaisey, et al.; Multispectral Image Coding Using Lattice VQ and The Wavelet Transform; 1998 IEEE; p. 307-311.

* cited by examiner

BIJECTION MAPPING FOR COMPRESSION/DENOISING OF MULTI-FRAME IMAGES

CROSS REFERENCE TO RELATED APPLICATIONS

This application claims rights under U.S. Patent Application Ser. No. 60/360,457, filed Feb. 28, 2002 under 35 U.S.C. § 19(e).

STATEMENT OF GOVERNMENT INTEREST

The U.S. Government may have rights in this application as a result of activities conducted under Government Contract No. DAAL 01-96-2-0002 awarded by the Department of the Army.

BACKGROUND OF THE INVENTION

1. Field of the Invention

The present invention relates to algorithms and more particularly to algorithms useful in image compression.

2. Brief Description of Prior Developments

The number of systems generating multiple images of the same scene at different frequency bands and their applications have rapidly increased in the last several years. Remote sensing systems, thematic mapper sensors, and multispectral Forward Looking Infrared (FLIR) systems are only a few examples of such systems. The data product of a multispectral sensor is a stack of images for each scene referred to as a multispectral image or data cube. Each band or component of a multispectral image can be considered as a monochrome (scalar) image. Multispectral imagery provides signal diversity that can lead to more precise and accurate results than otherwise possible with traditional single spectral imagery. A major limitation of multispectral imaging systems in practice is the required manipulation and delivery of the associated massive data files. In order to store and transmit such files, very efficient compression tools are needed. Because of this need, this disclosure shall focus on a new method for lossy compression. True lossless compression is limited in performance; here, we allow the compression to be lossy but implicitly maintain control over the fidelity of the compressed imagery so we may trade off rate vs. distortion.

To date, many of the approaches for lossy multispectral image compression rely on two stages of data processing assuming that the various bands are perfectly registered. Typically, these methods first apply a 1-Dimensional Karhunen-Loève transform (KLT) along the spectral dimension leading to a set of spectrally uncorrelated eigen-images, and subsequently each of the resultant eigen-planes is compressed using a scalar image compression method such as JPEG or wavelet based compression as is disclosed in J. A. Saghri, A. G. Tescher & J. T. Reagan, "Practical transform codeing of multispectral imagery," *IEEE Signal Processing Magazine*, pp. 32–43, January, 1995. The compression rate for each eigen-image is determined through a bit allocation strategy. Other 2-stage compression methods first decorrelate the data by applying a 2D frequency transform along the spatial dimensions and a 1-dimensional KLT is subsequently applied across the spectral dimension as is disclosed in D. Tretter, C. A. Bouman, "Optical transforms for multispectral and multilayer image coding," *IEEE TIP*:4:296–308, March, 1995, J. N. Bradley & C. M. Brislawn; "Spectrum analysis of multispectral imagery in conjunction with wavelet/klt data compression," Proc. ASIMOLAR Conf. 1:26–30, November, 1993; and J. Vaisey, M. Barlaud & M. Anonini, "Multispectral Image Coding Using Lattice VQ and the Wavelet Transform," Proc. ICIP 98, Chicago, Ill., 1998. Quantization and coding is then used to encode the transform coefficients. As is also reported in "Spectrum analysis of multispectral imagery in conjunction with wavelet/klt data compression," Proc. ASIMOLAR Conf. 1:26–30, November, 1993; and J. Vaisey, M. Barlaud & M. Anonini, "Multispectral Image Coding Using Lattice VQ and the Wavelet Transform," Proc. ICIP 98, Chicago, Ill., 1998 at high compression rates (less than 0.2 bit/pixel/image), both methods seem to have the same performance. The two-stage approaches mentioned above, however, have three disadvantages:

1. Image decorrelation is performed in a separable fashion, first along the spectral dimension and subsequently along the spatial dimension or vice versa. The separable approach is intrinsically suboptimal as the spatial and spectral statistics are not exploited jointly;
2. The KLT is data dependent and consequently it must be computed for each image set resulting in an unacceptable amount of computation;
3. Transformed image planes after the initial decorrelation are coded independently of the others, despite of the spatial similarities across bands. The focus of this paper is to introduce a method which exploits spatial and frequency correlation jointly.

Figure 1:
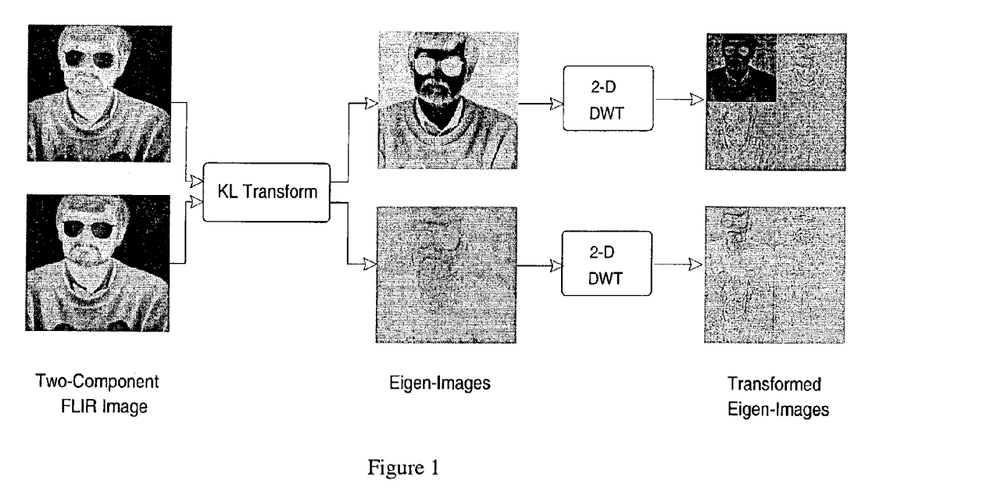
FIG. 1 is a schematic drawing showing a two-stage approach for compression of a multispectral, two-color FLIR image, wherein spectral transform is followed by 2-D DWT and the multispectral image is a two-color focal plane array LWIR/MWIR.

The following example illustrates these issues. Consider a vector-valued $M_1 \times M_2$ multispectral image $f(m))=[f_1(m), f_2(m), \ldots, f_L(m)]^T$ with L bands. $m=(m_1,m_2)$ represents a pixel's spatial position with $m_1=1, \ldots, M_1$ and $m_2=1, \ldots, M_2$, and $1 \leq k \leq L$ is the spectral band index. The multispectral image is thus composed of $M_1 \times M_2$ f-vectors of length L. The image is then processed by the two-stage compression method described above, where a 1-Dimension KLT is applied along the spectral dimension. Let $R=E(f(m)f^T(m))$ be the spectral correlation matrix and let $q_i$ and $\lambda_i$, $i=1, \ldots, L$, be the eigenvectors and eigenvalues of R respectively. The KLT of f(m) along the spectral dimension is $g(m)=Q^T f(m)$ where $Q=[q_1, q_2, \ldots, q_L]$ is the L×L matrix whose columns are the eigenvectors of R. The resultant KLT coefficients form a set of images, $\{g_1(m), g_2(m), \ldots, g_L(M)\}$ referred here to as eigen-images. FIG. 1 depicts the KLT of a 2-band image into a pair of decorrelated eigen-images. A three-level wavelet decomposition of each eigen-image is also shown. These images clearly show that although the eigen-images are decorrelated across bands at a particular pixel location, cross-band correlation among groups of pixels remains. The residual cross-band correlation results in a strong spatial similarity not exploited by the wavelet transforms applied to each eigen-image. In fact, FIG. 1 shows that spatial similarity remains after the wavelet transforms are applied.

An approach to overcome the shortcomings of the two-stage compression algorithm would be to design a coder that takes advantage of the intra-band and cross-band spatial similarities. A 3D (3D) zero-tree coder, for instance, can be designed to jointly exploit the intra-band and cross-band correlations inherent in a data cube as is disclosed in A. Bilgin, G. Zweig & M. W. Marcellin, "Three-dimensional Image Compression using Integer Wavelets," Appl. Optics, 39#11:1799–1814, April, 2000. This, however, can become very complex since the number bands to be jointly encoded can be quite large. Also, the bands are typically separable in three-dimensions and the zero-tree coder spawns children at a cubic rate having implications for the production of zero-trees. Or three-dimensional data may be processed via some three-dimensional extension of a well-known transform such as the DCT G. Abousleman, M. W. Marcellin & B. Hunt, "Compression of Hyperspectral Imagery using 3-D DCT and Hybrid DPCM/DCT," IEEE TGRS 33#1:26–34, January, 1995. Here, again, there is the question of complexity and the constraints imposed by block transformation. In reference 6, the authors back off from processing using a 3D DCT in favor of a compromise using 2D DCT and DPCM in the spectral domain.

SUMMARY OF INVENTION

The present invention is an approach to multispectral image compression where the intra- and cross-band correlations are jointly exploited in a surprisingly simple yet very effective manner. The method is based on the fact that it is more efficient to jointly encode all the components of a vector source than to encode each component separately as is disclosed in A. Segall, "Bit allocation and encoding for vector sources," IEEE Trans. Inf. Thy. IT-22:162–169, March 1976. The key component of the algorithm is a simple transformation, a bijection mapping of the original multispectral image into a virtual two-dimensional (2D) scalar image. In this research, we combine the bijection mapping with a very efficient scalar image-coding algorithm, the SPIHT codec as is disclosed in A. Bilgin, G. Zweig & M. W. Marcellin, "Three-dimensional Image Compression using Integer Wavelets," Appl. Optics, 39#11:1799–1814, April, 2000. The SPIHT codec need not be modified for 3D operation. The choice of the bijection mapping will determine the way in which spatial and spectral information are combined: there is no intrinsic limit in number of bands processed at a time nor in the way spectral and spatial pixels are combined. Combining the bijection mapping with the SPIHT codec gives a no frills, low complexity method for processing multispectral data. This may be improved by selecting the optimal bijection mapping which is equivalent to the problem of finding a permutation map which reduces activity across pixels to effect pixel prediction. This latter optimization problem has been investigated largely in the context of lossless compression, as is disclosed in S. Tate, "Band Ordering in Lossless Compression of Multispectral Images," IEEE TCOM 46#4:477–483, April, 1997; J. Wang, K. Zhang & S. Tang, "Spectral and Saptial Decorrelation of Landsat-M Data for Lossless Compression," IEEE GRS 33#5:1277–1285, September, 1995; N. Sidiropoulos, M. Pattichis, A. Bovik & J. Havlicek, "COPERM: Transform-Domain Energy Compaction by Optimal Permutation," IEEE TSP 47#6:1679–1688, June, 1999; and Z. Arnavut, "Applications for inversions to lossless image compression,", Opt. Eng. 36#4:1028–1034, April, 1997. Here we shall propose another optimization approach with the goal of optimizing lossy compression. Activity from pixel to pixel is reduced for the purpose of introducing zero-trees into the coded stream thereby increasing compression without increasing distortion. By optimally mapping the multispectral image set into a single 2D-array and by subsequently applying a 2D-decomposition, the spatial correlation as well as the spectral correlation are jointly exploited. In this manner, the self-similarities across the different scales of the virtual image are exploited. Based on the statistical characteristics of the multispectral data, the bijection mapping can be optimized to minimize the distortion introduced by the compression algorithm. The optimization proposed here reduces to the maximization of a function that depends on the second-order statistics of the multispectral data.

BRIEF DESCRIPTION OF THE DRAWINGS

The present invention is further described with reference to the accompanying drawings wherein:

FIGS. 4(a) and 4(b) are flow charts, wherein FIG. 4(a) shows a compression algorithm: bijection mapping follow by SPIHT encoder, and FIG. 4(b) shows a decompression algorithm: SPIT decoder followed by inverse bijection mapping;

FIGS. 5(a) and (b) are schematic drawings showing two different bijection mappings of the bispectral FLIR image;

FIGS. 6(a)–6(d) are graphs of lines of images ouputted by bijection mapping in FIG. 5, wherein FIG. 6(a) depicts the marked line in FIG. 5(a) and FIG. 6(c) depicts the marked line in FIG. 5(b), and FIGS. 6(b) and 6(d) depict the same lines after images are compressed;

FIGS. 8(a)–8(d) show the second band of the reconstructed images at 0.08 bit/pixel/band wherein FIG. 8(a) is the original band, FIG. 8(b) shows a separable approach, FIG. 8(c) is from a traditional two-stage algorithm, and FIG. 8(d) is from bijection mapping onto zeros trees;

FIGS. 10(a)–10(d) show the first band of the non-training image at 0.1 bit/pixel/band, wherein FIG. 10(a) is the original, FIG. 10(b) shows a separable approach, FIG. 10(c) is from a traditional two-stage approach, and FIG. 10(d) is from bijection mapping onto zero trees;

FIGS. 11(a)–11(d) show band VH of the polarimetric SAR data at 0.4 bit/pixel/band, wherein FIG. 11(a) is the original image, FIG. 11(b) is from a separable approach, FIG. 11(c) is from a two-stage approach, and FIG. 11(d) is from bijection mapping onto zero-trees.

DETAILED DESCRIPTION OF THE PREFERRED EMBODIMENT

1. Multispectral Image Compression Using Bijection Mappings

1.1 Bijection Mappings

Figure 2:
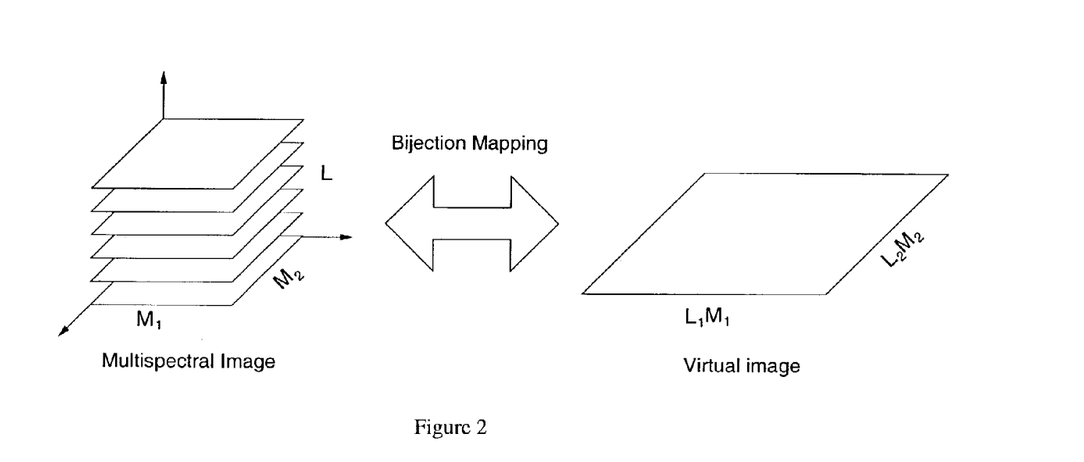
FIG. 2 is a schematic drawing showing a bijection mapping of a multispectral image into a virtual 2D image, wherein $L_1L_2=L$.

A bijection mapping is a one-to-one onto function that maps set A to set B. The set A is called the domain of $\phi(x)$ and the set of all elements $\phi(x) \in B$ is called the range of $\phi(x)$. The one-to-one correspondence between an element in A and an element in B assures that the function is invertible. That is, if $\in B$, $\phi^{-1}(y)$ is the set of all $x \in A$ such that $\phi(x)=y$. $\phi^{-1}(x)$ is called the inverse of the function $\phi(x)$. In our application, a special type of bijection mapping is used. Let $R^{M_1 \times M_2}$ be the set of $M_1 \times M_2$ arrays defined over the set of real numbers R. Furthermore, let $R^{M_1 \times M_2 \times L}$ be the set of $M_1 \times M_2$ arrays where each element in the array is a L-component vector defined over the set of real numbers. For instance, if $f \in R^{M_1 \times M_2 \times L}$, then f has the following structure $$f = \begin{bmatrix} f(1,1) & f(1,2) & \ldots & f(1,M_2) \\ f(2,1) & f(2,2) & \ldots & f(2,M_2) \\ & & \ddots & \\ f(M_1,1) & f(M_1,2) & \ldots & f(M_1,M_2) \end{bmatrix}, \quad (1)$$

where $f(m_1,m_2)=[f_1(m_1,m_2),f_2(m_1,m_2)\ldots f_L(m_1,m_2)]^T$ is an L-component vector and where each element of $f(m_1,m_2)$ is defined over the set of real numbers, i.e. $f_k(m_1,m_2) \in R$. A $M_1 \times M_2$ multispectral image with L bands is an example of an element in $R^{M_1 \times M_2 \times L}$, whereas each $M_1 \times M_2$ monochrome (scalar) image belongs to the set $R^{M_1 \times M_2}$. As shown in FIG. 2, the bijection mappings utilized in this paper are defined as a one-to-one permutation of the elements in $R^{M_1 \times M_2 \times L}$ onto the set $R^{L_1 M_1 \times L_2 M_2}$. That is, $$B: R^{M_1 \times M_2 \times L} \rightarrow R^{L_1 M_1 \times L_2 M_2}, B(f_k(m_1,m_2))=G(i,j) \quad (2)$$

$m_1=1, 2, \ldots, M_1; m_2=1, 2, \ldots, M_2; k=1, 2, \ldots, L; i=1, 2, \ldots, L_1 M_1, j=1, 2, \ldots, L_2 M_2$ where $G \in R^{L_1 M_1 \times L_2 M_2}$ is the range of the bijection mapping B and $R^{M \times M_2 \times L_1}$ is its domain. $L_1$ and $L_2$ are integers such that $L=L_1 . L_2$. The bijection mapping of a multispectral image is thus defined as a mapping of the 3D data stack into a 2D virtual image. This mapping includes normalization such that neighboring pixels in the virtual image have similar dynamic range. The mapping is invertible since the original data cube can be perfectly reconstructed from the virtual two-dimensional array. Each array defined in $R^{L_1 M_1 \times L_2 M_2}$ is related to an element in $R^{M_1 \times M_2 \times L}$ through the inverse bijection mapping:

$$B^{-1}: R^{L_1 M_1 \times L_2 M_2} \rightarrow R^{M_1 \times M_2 \times L}, B^{-1}(G(i,j))=f_k(m_1,m_2). \quad (3)$$

In summary, $R^{M_1 \times M_2 \times L}$ represents the set of $M_1 \times M_2$ multispectral images with L bands, $B(R^{M_1 \times M_2 \times L})$ represents the associated set of two-dimensional arrays.

1.2 Bijection Mappings onto Zero-Trees

Figure 3:
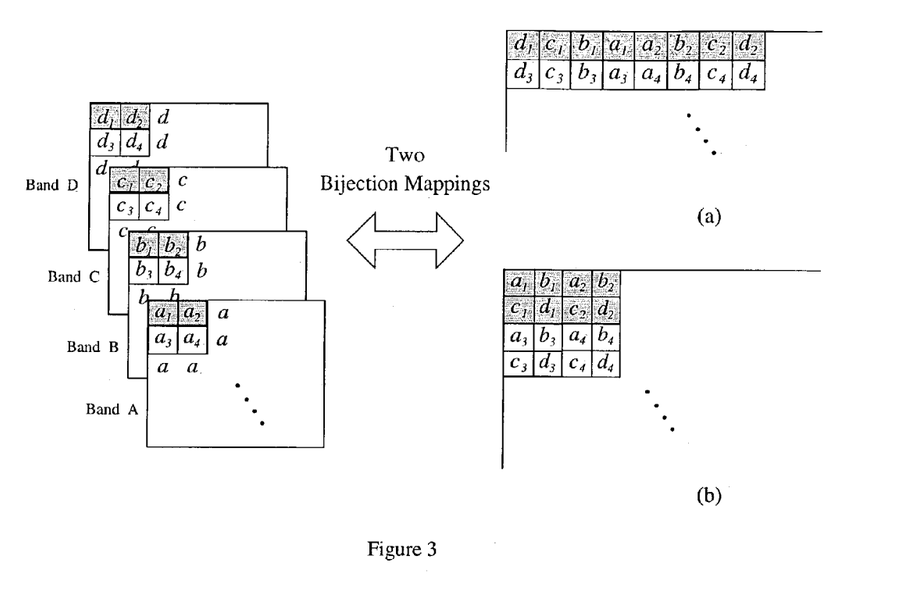
FIG. 3 is a schematic drawing showing two bijection mappings of a 1×2×4 (4-band) stack into (a) a 1×8 array, and (b) a 2×4 array.

For an array $f \in R^{M_1 \times M_2 \times L}$, there are $(LM_1 M_2)!$ possible bijection mappings $B: R^{M_1 \times M_2 \times L} \rightarrow R^{L_1 M_1 \times L_2 M_2}$ for a given $L=L_1 L_2$. With most multispectral images having spatial dimensions larger than 512×512, direct bijection mappings of the multispectral images themselves prove to be computationally prohibitive. While the number of mathematically conceivable bijections is large, the number useful for the application at hand is much smaller. We expect only those bijections that map a small, spatially contiguous, vector-pixel set to be relevant for compression because the correlations among the associated pixels will tend to be large. Therefore, a simpler approach to handle large image files is to break the multispectral image stack into smaller non-overlapping sub-images of depth L. That is, the spatial domain is partitioned while the spectral dimension is not, as L is typically in the order of 15 or less for multispectral images. The bijection mapping of a multispectral image thus reduces to the bijection mapping of $N_1 \times N_2 \times L$ image cells as depicted in FIG. 3. Assuming that the images are homogeneous, all cells are treated equally and the same bijection mapping is applied to all image cells. This concept could be generalized where various types of bijection mappings are applied to different image cells depending on their statistical characteristics. For the sake of simplicity, at this time, we treat all cells uniformly. The multispectral image is first divided into cells of size $N_1 \times N_2 \times L$. Each 3D cell is then subjected, independently of the others, to a bijection mapping. The resultant two-dimensional arrays are placed into a large single array according to the position of the original 3D cells. FIG. 3 shows two different bijection mappings of a four-band cube, where the size of each cell is 1×2×4. In FIG. 3(a), each cell is mapped to a 1×8 array, i.e., $B: R^{1 \times 2 \times 4} \rightarrow R^{1 \times 8}$. FIG. 3(b) shows a different bijection mapping where each cell is mapped to a 2×4 array. That is $B: R^{1 \times 2 \times 4} \rightarrow R^{2 \times 4}$. The shaded pixels are the bijection mapping of the first 3D cell, upper-left corner. The unshaded pixels show the bijection mapping of the neighboring block. Note that the locations of both two-dimensional arrays are in accordance with the position of the 3D cells. For simplicity, only a few pixels of the cube are depicted and no normalization of the data is depicted at this time. In a practical implementation the data has to be normalized such that the various components are given the same dynamic range. Having defined the image partition into smaller cells in $R^{N_1 \times N_2 \times L}$, the proposed compression algorithm consists of:

1. Mapping each cell by $B: R^{N_1 \times N_2 \times L} \rightarrow R^{L_1 N_1 \times L_2 N_2}$ into the $L_1 N_1 \times L_2 N_2$ array.
2. Tiling the obtained arrays into a virtual image I.
3. Encoding the virtual image I by a zero-tree coder.
4. Attaching the type of bijection mapping used as a header.

Figure 4:
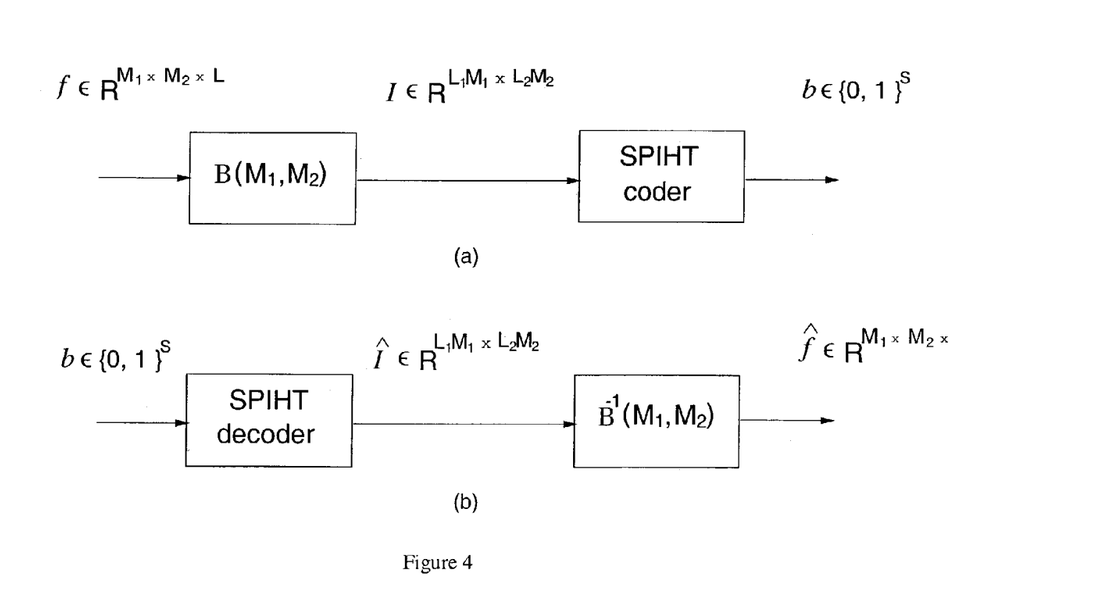

FIG. 4 shows the proposed compression algorithm. Note that the compressed image is a binary bit string whose length, denoted by S in FIG. 4, is determined by the compression ratio. Note also that the last step of the proposed algorithm, not shown in FIG. 4, adds information needed by the decoder to reconstruct the multispectral data. This overhead, however, is negligible compared to the amount of compressed data. As it will be shown shortly, a permutation matrix that defines the re-ordering of the data pixels can compactly represent the bijection mapping. (Figure to be included)

The multispectral image decoder reverses the encoding process by:
1. Extracting the type of bijection mapping from the file header.
2. Reconstructing the virtual image $\hat{I}$ with the zero-tree decoder.
3. Partitioning the virtual image $\hat{I}$ into $L_1 N_1 \times L_2 N_2$ cells and mapping back each cell by $B^{-1}: R^{L_1 N_1 \times L_2 N_2} \rightarrow R^{N_1 \times N_2 \times L}$, to form the reconstructed 3D cells.
4. Concatenating the obtained cells to form the multispectral image.

Given the bijection mapping onto the zero-tree codec shown in FIG. 4, the following questions arise.
1. How are $N_1$ and $N_2$ chosen so as to maximize the attained energy compaction?
2. Given $N_1$ and $N_2$ there are $(LN_1 N_2)!$ possible bijection mapping. How does one select a bijection mapping so as to maximize the energy compaction?

Energy compaction, $E_c$, is defined as where $E_T$ is the total energy of the multi spectral image $$E_c = \frac{E_u}{E_T} \quad (4)$$

and $E_u$ is the energy compacted in the approximation of the wavelet decomposition. In compression, higher $E_c$ generally translates into smaller distortion in the reconstructed data. The answer to the first question reduces to how much computational complexity can we tolerate? If $N_1 > N_i$, i=1,2, and letting $\{B(N_1,N_2)\}$ be the set of all possible bijection mappings of a $N_1 \times N_2$ cell, then $\{B(N_1, N_2)\} \subset \{B(N'_1, N'_2)\}$. Hence, we will always do equal or better as $N_1$ and $N_2$ are incremented. The real issue is, how much gain does one attain as $N_i$ is incremented to $N_i+1$, $N_i+2$, because the size of the search space increases as $(LN_1N_2)!$. It is conceivable that an optimum may be achieved for small values of $N_1$, $N_2$ in which case picking a larger cell adds computation. As $N_1$ is incremented to $N_1+1$, an additional $(LN_2)$ possible bijection mapping are added to the search space. A related and perhaps more important question is: if only one parameter is incremented, either $N_1$ or $N_2$, which one should be chosen. In summary, the performance gain as the size of $N_1$ and $N_2$ are monotonically increased, is somewhat reminiscent to the order of an AR model. In fact, some of the same issues that arise on selecting the order of an AR model also arise here such as overfitting, complexity, etc. The second question is perhaps the most important since it is directly related to energy compaction. Having fixed $N_1$ and $N_2$ which one of the $(LN_1N_2)!$ bijection mappings will maximize the energy compaction? Answers to these questions will be given in Section 3. Table 1 shows through a simple numerical example the performance gain that is achieved using bijection mapping.

2. Optimal Bijection Mappings

The approach to the design of the image partition size $N_1 \times N_2$ is through heuristics, although other more elaborated approaches can be used. In the heuristic approach, the type of the 2D transform used in the encoding stage determines the shape of the partition cell. To decorrelate the virtual image, SPIHT uses a two-dimensional discrete wavelet transform that exploits the correlation by filtering the image first along the rows and then along the columns. This fact provides a reliable guideline defining $N_1$ and $N_2$ as well as the shape of the two-dimensional array, i.e. $L_1$ and $L_2$, inherent in the bijection mapping. We have found experimentally for the data to be considered that the correlation existing in a $1 \times N_2 \times L$ cell is better captured by the wavelet decomposition if each $1 \times N_2 \times L$ cell is mapped into a $1 \times N_2L$ array. Thus, $N_2$ consecutive vector-pixels in the same row are mapped into a $1 \times N_2L$ array. This leads to a bijection mapping $B: R^{1 \times N_2 L} \to R^{1 \times LN_2}$ for each 3D cell, yielding a virtual image of size $M_1 \times LM_2$. For simplicity, we assume that $M_2/N_2$ is an integer. Taking into account the two-dimensional transform used in the proposed compression algorithm, the bijection mapping of a $M_1 \times M_2$ multispectral image f(m) with L bands reduces to $B: R^{M_1 \times M_2 \times L} \to R^{M_1 \times LM_2}, G=B(f)$, where $$B(f) = \begin{bmatrix} P\begin{bmatrix} \sigma f(1,1)+\mu \\ \vdots \\ \sigma f(1,N_2)+\mu \end{bmatrix} & \cdots & P\begin{bmatrix} \sigma f(1, M_2-N_2+1)+\mu \\ \vdots \\ \sigma f(1, M_2))+\mu \end{bmatrix} \\ \vdots & \ddots & \vdots \\ P\begin{bmatrix} \sigma f(M_1,1)+\mu \\ \vdots \\ \sigma f(M_1, N_2)+\mu \end{bmatrix} & \cdots & P\begin{bmatrix} \sigma f(M_1, M_2-N_2+1)+\mu \\ \vdots \\ \sigma f(M_1, M_2)+\mu \end{bmatrix} \end{bmatrix}, \quad (5)$$

where $f(m_1,m_2)$ is the vector-valued pixel at $(m_1,m_2)$, $\mu=[\mu_1, \mu_2, \ldots, \mu_L]^T$ and $\sigma=\text{diag}(\sigma_1, \sigma_2, \ldots, \sigma_L)$ normalize the data set, where $\sigma_k$ and $\mu_k$ are chosen such that the resultant normalized spectral components have the same dynamic range. It is shown in Table 2 that $\sigma_k$ and $\mu_k$ are given respectively by:

$$\sigma_k = \frac{cov(f_k, \bar{f})}{var(f_k)} \quad (6)$$

$$\mu_k = \bar{\bar{f}} - \sigma_k f_k,$$

where cov(x,y), var(x) and $\bar{x}$ denote the covariance, variance and mean respectively, and $$\bar{f} = \frac{\sum_{k=1}^{L} f_k}{L}$$

is the image obtained by averaging the different spectrum components. Note that in the above equations the spatial index $m=(m_1,m_2)$ has been dropped for simplicity.

P in (5) is an $LN_2 \times LN_2$ matrix that contains exactly one 1 in each row and column. P is referred here to as a permutation matrix since it defines the re-ordering of the pixels into the array G. FIG. 3(a) shows the case when $N_2=2$ and L=4. Note in FIG. 3(a) that, for the shaded block, the vector-valued pixels are $f(1,1)=[a_1, b_1, c_1, d_1]^T$ and $f(1,2)=[a_2, b_2, c_2, d_2]^T$, $\sigma=I_2$, $\mu=[0\ 0]^T$ and the permutation matrix for this example is $$P = \begin{bmatrix} J_4 & O_4 \\ O_4 & I_4 \end{bmatrix}, \quad (7)$$

where $I_N$ is an N×N identity matrix, $0_N$ is an N×N all zero matrix and $J_N$ is an N×N right-to-left diagonal matrix. Note also that $$P\begin{bmatrix} f\ (1,1) \\ f\ (1,2) \end{bmatrix}$$

gives re-ordering of the shaded samples into the two-dimensional array. Each permutation matrix defines a different re-ordering and therefore a different bijection mapping. The permutation matrix P defining the re-ordering of the samples thus characterizes a bijection mapping. A fundamental problem is thus the design of P that leads to the highest compression attainable. For a $1 \times N_2 \times L$ cell, there exists $(LN_2)!$ different re-orderings of the samples inside a cell.

This, consequently, leads to $(LN_2)!$ different $M_1 \times LM_2$ virtual images. Some of them are more suitable for compression than others. We expect those mappings with the pixels arranged to maximize low frequency correlation to be the best for compression. The question that naturally arises is which one of the $(LN_2)!$ bijection mappings generates virtual images that are most suitable for compression. Under the energy compaction viewpoint, the optimal bijection mapping is the one that compacts the most energy onto the low frequency components in the transform domain. Thus, the optimal bijection mapping, B(P) is selected such that for a fixed wavelet transform, where $E_c$ is the energy compaction $$B_0 = \max_P E_c(B(P)), \qquad (8)$$

defined in (4). Since the total energy of a multispectral image does not depend on the bijection mapping nor on the wavelet transform used, (8) reduces to maximizing the energy compacted in the low-frequency components of the wavelet domain. If the wavelet transform is applied to an image that is smooth, having most of its energy in the lowpass band of the spectrum, the resultant energy compaction is high. On the other hand, if the energy of an image is concentrated in the highpass band of the spectrum, the wavelet transform will have more of the energy distributed on the high-frequency components of the wavelet domain, resulting in poor energy compaction.

Figure 5:
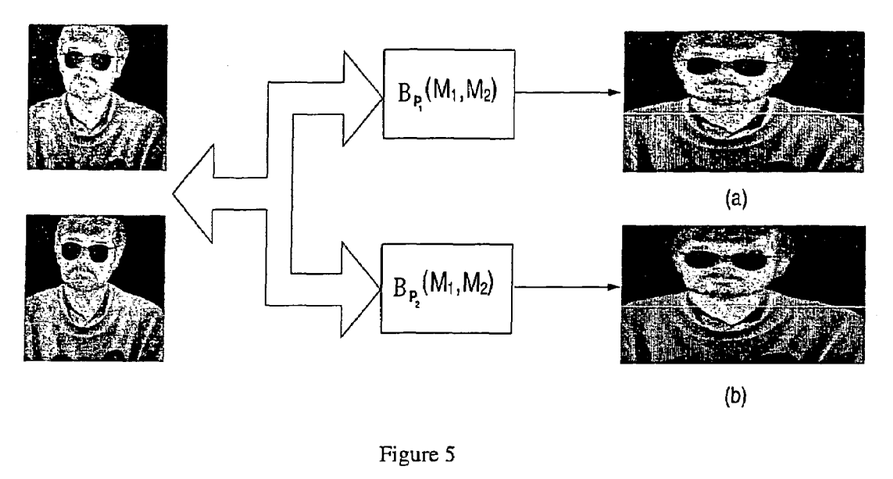
Figure 6A:
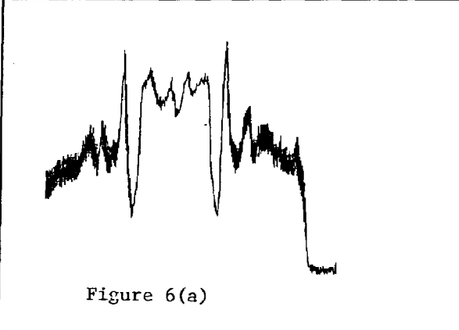
Figure 6B:
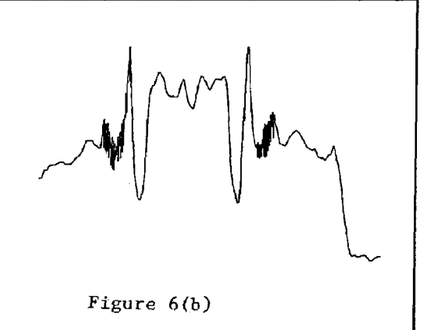
Figure 6C:
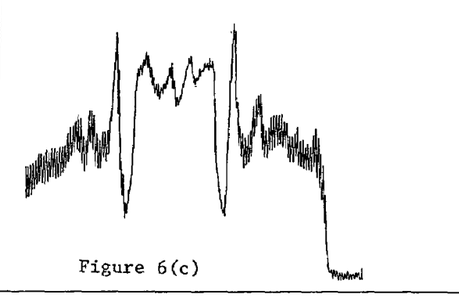
Figure 6D:
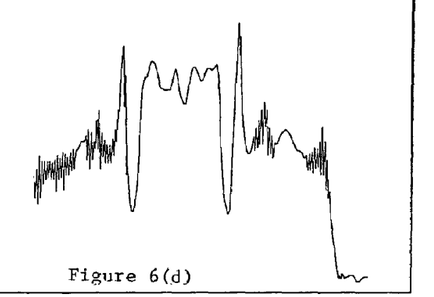

To illustrate this point better, FIG. 5 shows two different bijection mappings of a bispectral FLIR image. Although the images outputted by the two different bijection mappings look similar, they have markedly different characteristics. To observe their differences better, FIG. 6(a) and FIG. 6(c) depict horizontal scans marked as white lines in FIG. 5. Note that the line shown in FIG. 6(c) is smoother than the one plotted in FIG. 6(a). FIG. 6(b) and FIG. 6(d) show the same lines after the virtual images outputted by the bijection mappings have been compressed/decompressed. The reconstructed line of FIG. 6(d) is less distorted than the one depicted in FIG. 6(b). We use this observation in order to redefine the optimization problem as follows. The optimal bijection mapping B is the one that generates the smoothest virtual image which is the most suitable image for compression. As a measure of image smoothness, we use the correlation between consecutive samples in the virtual image. Finding the optimal bijection mapping reduces to finding the best re-ordering of the samples in the virtual image that maximizes the spatial correlation.

Let $\bar{f}$ be the vector formed by concatenating the normalized vector-valued pixels in a cell of size $1 \times N_2 \times L$, i.e.

$$\bar{f} = [\sigma f(m_1, m_2)^T + \mu^T, \sigma f(m_1, m_2+1)^T + \mu^T, \ldots, \sigma f(m_1, m_2 + N_2)^T + \mu^T]^T.$$

Furthermore, let $\bar{g} = P\bar{f}$ be a re-ordered vector of $\bar{f}$ produced by the permutation matrix P. We want to find the best re-ordering of the components of $\bar{f}$ such that the sum of correlations between consecutive components of the re-ordered vector is maximized. Let $r_{i,j}$ be the correlation between the i th and j th components of $\bar{g}_p$. Since $\bar{f}$ is formed by concatenating $N_2$ consecutive normalized vector-valued pixels, $r_{i,j}$ represents the spectral correlation, or the spatial correlation, or the cross-correlation between pixels. The objecting function to be maximized is then given by $$\max_{\text{all } \bar{g}_p} \left[ \sum_{i=1}^{LN_2} r_{i,i+1} + r_{LN_2,1} \right] = \max_{\text{all } \bar{g}_p} E(\bar{g}_p A \bar{g}_p) \qquad (9)$$

where $r_{LN_2,1}$ takes into account the fact that the bijection mapping of consecutive 3D-cells is concatenated according to (5). A is an $LN_2 \times LN_2$ matrix operator that circularly shifts the components (rows) of a vector (matrix) one position up, i.e., $$A = \begin{vmatrix} 0 & 1 & 0 & \ldots \\ 0 & 0 & 1 & \ldots \\ & \ddots & \ddots & \\ 1 & 0 & 0 & \ldots \end{vmatrix} \qquad (10)$$

Since $P\bar{f}$, the objective function (9) can be rewritten as a function of the permutation matrix P as follows:

$$\max_{P \in \Omega}(E(\bar{f}^T P^T A P \bar{f})), \qquad (11)$$

where $\Omega$ is the set of all permutation matrix of size $LN_2$. Thus, finding the best re-ordering of the components of $\bar{f}$ that produces a smooth virtual image reduces to finding the permutation matrix P that maximizes (11). The optimal permutation matrix P is determined using a heuristic search of the space $\Omega$.

2.1 Sub-Optimal Bijection Mapping

Searching for the optimal solution of (11) can be time consuming since the search space is quite large. In fact, equation (11) has to be computed for each element in the search space $\Omega$, and the permutation matrix that yields the maximum value is chosen as the optimal solution. This can become computational expensive since the search space increases as $(LN_2)!$. To overcome this limitation, we propose a sub-optimal bijection mapping that has been experimentally proved to yield good results. This sub-optimal bijection mapping is described next.

Suppose that we have a $1 \times N_2 \times L$ 3D-cell to be mapped into a $1 \times N_2 L$ array. Without loss of generality, let us assume that $L=4$ and $N_2$ is an even number. Denote the four normalized bands as A, B, C and D, and the pixels belonging to those bands as $a_i$, $b_i$, $c_i$ and $d_i$ respectively where i denotes the spatial position of the pixel in the cell. Let $r_a$, $r_b$, $r_c$ and $r_d$ be the spatial correlations between two consecutive pixels in the bands A, B, C and D respectively. Furthermore, let $r_{X,Y}$ be the spectral correlation between the band X and Y where X □{A, B, C, D} and Y □{A, B, C, D}. The suboptimal bijection mapping follows the four-step procedure:

1. Select the pixels of the band that has the highest spatial correlation, say $\max(r_a, r_b, r_c, r_d) = r_a$, hence

| $a_1$ | $a_2$ | □ | $a_{N_2}$ |
|---|---|---|---|

2. On each side of the pixel set attach the pixels corresponding to the band that has the highest spectral correlation with respect to the band found in the previous step, say $\max(r_{A,B}, r_{A,C}, r_{A,D}) = r_{A,B}$, hence the re-ordering becomes

| $b_1$ | $b_2$ | ... | $b_{N_2/2}$ | $a_1$ | $a_2$ | ... | $a_{N_2}$ | $b_{N_2/2+1}$ | ... | $b_{N_2}$ |
|---|---|---|---|---|---|---|---|---|---|---|

3. On each side of the resultant array insert the pixels corresponding to the band that has not been merged yet and that has the highest spectral correlation with respect to the samples added in step 2, i.e. $\max(r_{B,C}, r_{B,D})$ defines the next band to be multiplexed. Following with the example and assuming that $r_{B,C} > r_{B,D}$, the re-ordering becomes $$c_1 \quad \ldots \quad c_{N_2/2} \quad b_1 \quad \ldots \quad b_{N_2/2} \quad a_1 \quad \ldots \quad a_{N_2} \quad b_{N_2/2+1} \quad \ldots \quad b_{N_2} \quad c_{N_2/2+1} \quad \ldots \quad c_{N_2}$$

Repeat the previous step up to all the bands are multiplexed into a single band. Figure [REF:fig:bijection](a) shows, for this example, the sub-optimal bijection mapping for $N_2=2$. This four-step procedure is repeated for each 3D cell and the resultant 2D array is tiled in the way described above for the optimal solution. Note that the key in the sub-optimal bijection mapping is to keep, as close as possible, those pixels that have a high correlation. Moreover, it takes into account both the spectral and spatial correlations in defining the re-ordering of the samples. For both optimal and sub-optimal solutions, $N_2$ has to be set to a small number (between 2 and 6). The reason for doing so lies in the fact that the spatial correlation decays rapidly as the distance between pixels increases.

3. Simulation Results

The proposed compression algorithm was applied to 4-band airborne multispectral data collected using the AISA Airborne Imaging Spectrometer. Each band is a monochrome 8 bit image of size 384×700. A 256×256 pixel area in the upper left part of each band is used as training data to compute the correlation matrix needed for the optimization algorithm. The optimal bijection mapping, $B_0$, is determined following the algorithm described in Section 3. The data is partitioned into 1×2×4 m cells. The bijection mapping $B_0: R^{1 \times 2 \times 4} \rightarrow R^{1 \times 8}$ is then applied to each cell to form the virtual image that is compressed by the SPIHT coder at a compression rate from 0.05 bit/pixel/band to 1 bit/pixel/band. The sub-optimal bijection mapping is also determined and used here for comparison.

In order to illustrate the efficiency of the proposed compression algorithm, we include the comparison of this approach with two additional compression algorithms. The first algorithm compresses each spectral band separately using the SPIHT coder, and thus only takes advantage of the spatial redundancy in the image set. We use this compression algorithm, referred here to as the separable approach, as a benchmark to see the advantage of exploiting all the redundancy existing in a multispectral data. The second algorithm uses the two-stage approach described in the introduction. That is, the KLT is computed along the spectral dimension to obtain the 4 eigen-planes. The SPIHT coder is then used to compress each eigen-plane at a compression rate that is proportional to the logarithm of the energy of the eigen-plane. In order to compute the covariance matrix needed for the KLT, the same 256×256 area used in the proposed algorithm is used here as training data. We use the Peak Signal-to-Noise Ration (PSNR) as a distortion measure of the quality of the reconstructed image. For 8-bit images of size $M_1 \times M_2$, PSNR is defined as:

$$PSNR(dB) = 10 * \log_{10}\left(\frac{255^2}{\frac{1}{M_1 M_2}\sum_{i=1}^{M_1}\sum_{j=1}^{M_2}(x_{i,j} - \hat{x}_{i,j})^2}\right), \quad (8)$$

where $x_{i,j}$ is the pixel at the i th row and j th column in the image and $\hat{x}_{i,j}$ is its corresponding reconstructed pixel.

Figure 7:
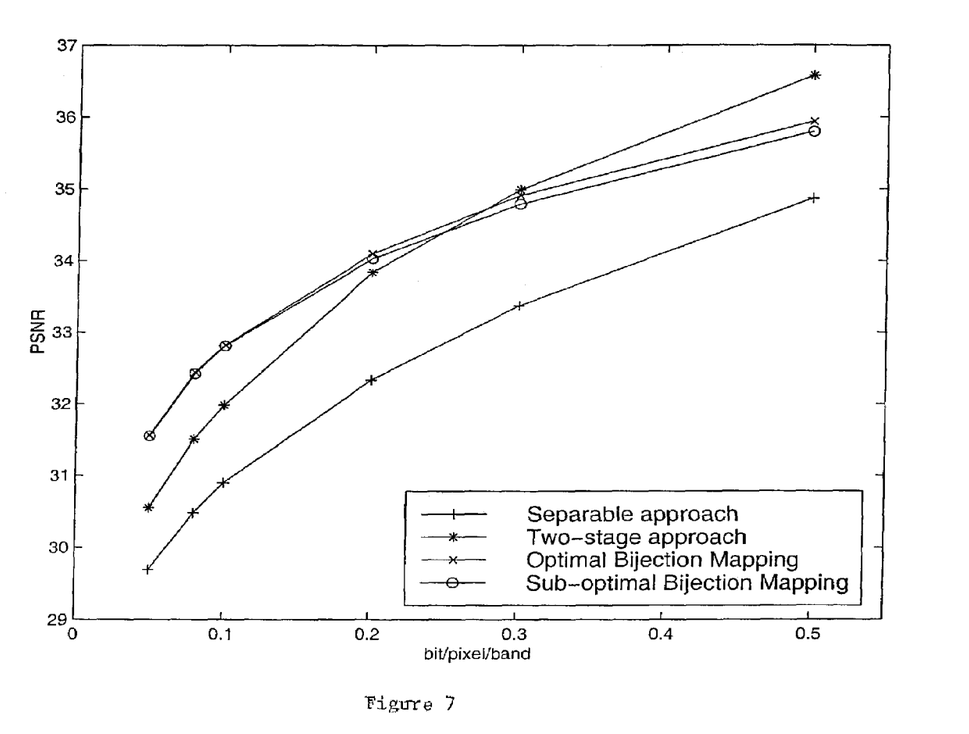
FIG. 7 is a graph of average PSNR of the four reconstructed bands achieved by the various compression algorithm.

PSNR is separately computed for each band. FIG. 7 shows the average PSNR obtained using the proposed algorithm (optimal and sub-optimal bijection mappings) and the algorithms described above for a compression rate between 0.05 bit/pixel/band to 1 bit/pixel/band.

Figure 8A:
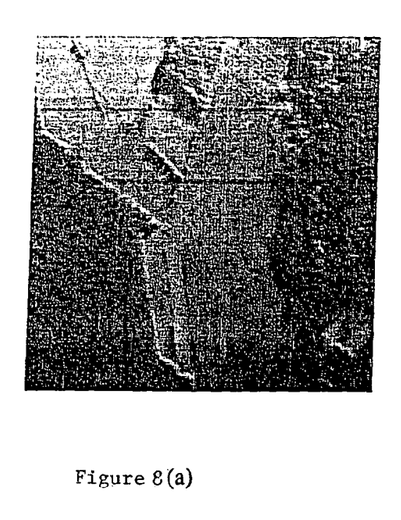
Figure 8B:
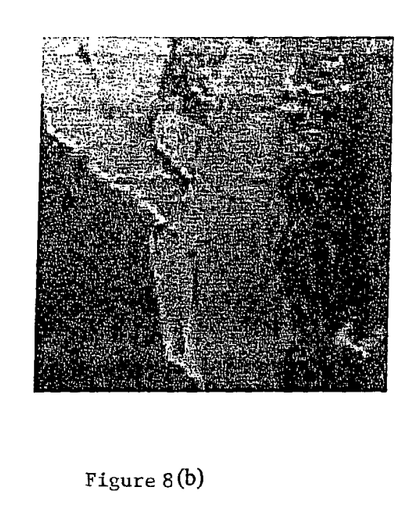
Figure 8C:
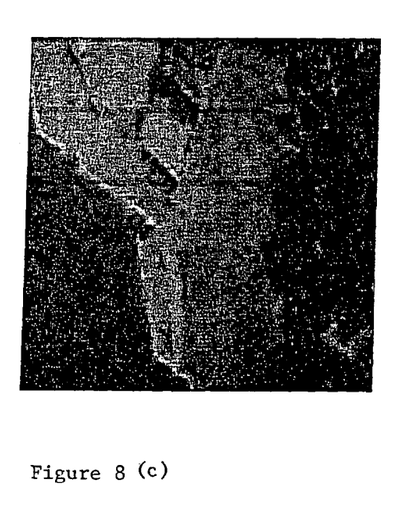
Figure 8D:
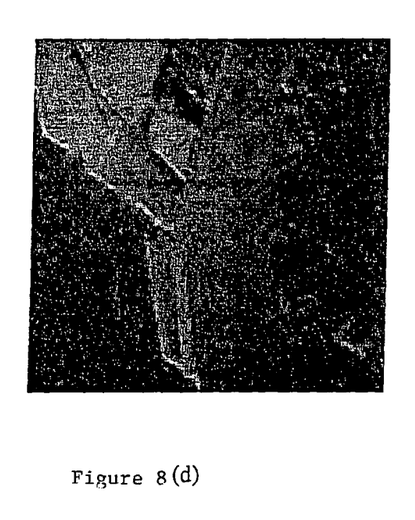

Note that for high compression rates (less than 0.25 bit/pixel/band), the proposed compression algorithm outperforms the two-stage compression algorithm. Note also that the sub-optimal bijection mapping yields similar results than those found with the optimal bijection mapping. FIG. 8 shows the second reconstructed band yielded by the different compression algorithms at a compression rate of 1:100 or equivalently 0.08 bit/pixel/band. FIG. 8(a) shows the original second band, FIG. 8(b) shows the performance achieved if each band is separately compressed; i.e. not spectral correlation is exploited. FIG. 8(c) shows the reconstructed image yielded by the two-stage algorithm and FIG. 8(d) depicts the corresponding band when the proposed compression method is taken. The sub-optimal bijection mapping yields similar visual performance to that of the optimal bijection mapping; therefore, its reconstructed image is not shown. Note that in the reconstructed image obtained using the proposed algorithm, the details are preserved and the edges are well defined. By comparison, there is noticeable blurring for the other reconstructions. Note also the poor performance that is achieved when the spectral correlation is not exploited. As can be seen by comparing the images and the PSNR curve of FIG. 7 the proposed compression method is simple yet very efficient particularly at very high compression rates.

In order to see the performance of the various compression approaches acting over unobserved data, a section of the four-band multispectral data that was not used as training data is compressed using the different algorithms. The same optimal and sub-optimal bijection mappings determined using the training data are used in the compression of the unobserved data. Similarly, the same eigenvectors of the covariance matrix determined using the training data are used to compute the KLT of the unobserved data for the two-stage compression algorithm.

Figure 9:
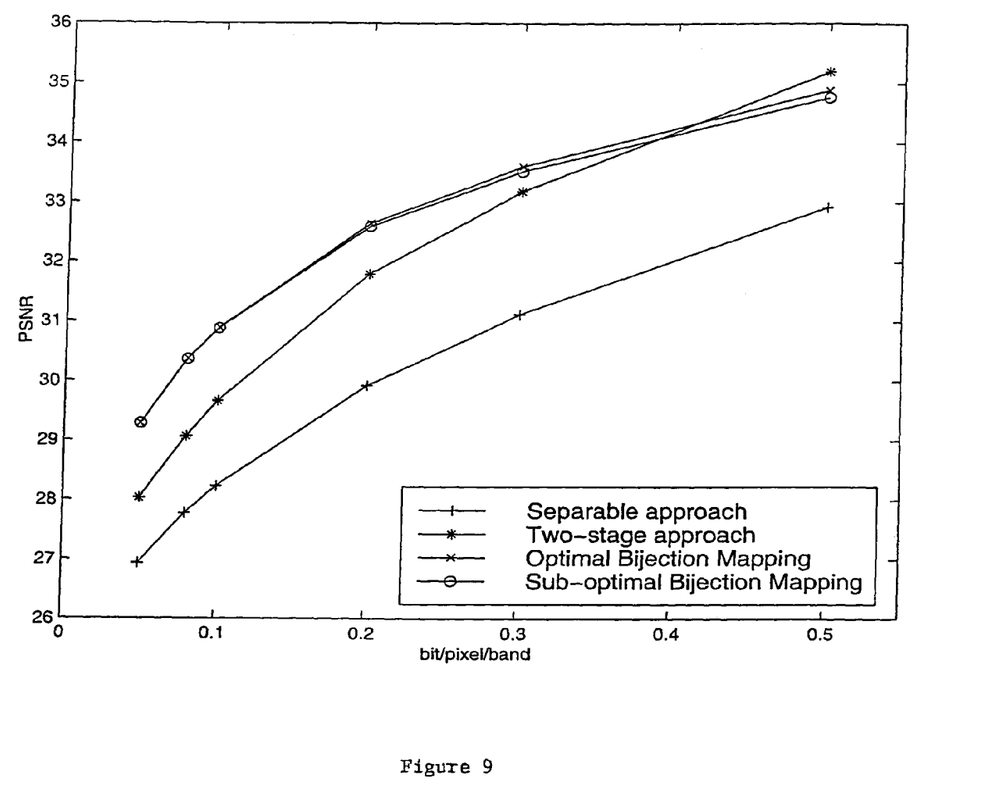
FIG. 9 is a graph showing performance of the different compression algorithms acting on unobserved data.
Figure 10:
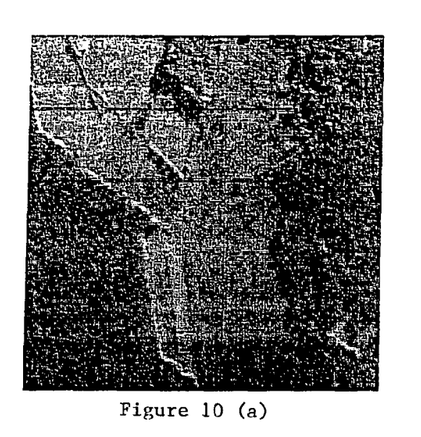

FIG. 9 shows the performance of the different algorithms acting on an unobserved data set. Observe that the two-stage approach is more data dependent than the proposed algorithm since the proposed approach outperforms the two-stage approach over a much wider range of compression rate. FIG. 10(a) shows the first band of the original unobserved data, and FIGS. 10 (b), (c) and (d) show the corresponding reconstructed images using the separable approach, the two-stage approach and the proposed algorithm respectively.

Figure 11:
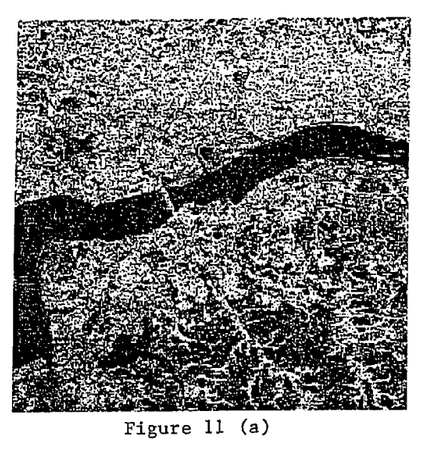
Figure 12:
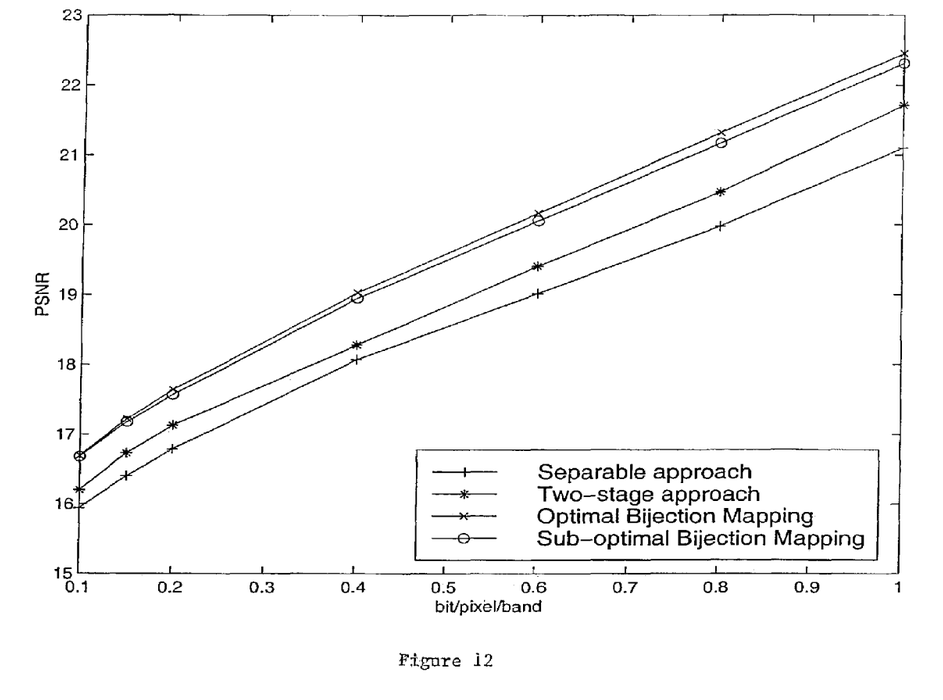
FIG. 12 is a graph showing coding performance achieved by the various algorithms on Polarimetric SAR data.

As a third example, we tested the algorithms on a four-component polarimetric Synthetic Aperture Radar (SAR) data which contains signal-dependent multiplicative noise[i]. The SAR data was collected by the EROS data center. 11(a) shows the Vertical-Horizontal (VH) polarization of the test data. FIG. 11(b) shows the performance of the separable approach. FIGS. 11(c) and (d) show the performance of the two-stage approach and the proposed approach, respectively. The reconstructed images shown in FIG. 11 are compressed 20:1. Note that at this compression the separable and two-stage algorithms exhibit ringing artifacts which are very disturbing. The PSNRs obtained using the different compression algorithms are displayed in FIG. 12. The bijection mapping onto zero-tree outperforms the other two methods by approximately 0.5 dB.

5. CONCLUSION

It will be understood by those skilled in the art that we have described a compression method for multispectral images that jointly exploits the spectral and spatial correlation inherent in a multispectral image in a simple yet efficient way. The proposed method uses a bijection mapping to project the 3D data cube into a two-dimensional array. A scalar image compression coder then compresses the obtained two-dimensional image. An optimization algorithm is developed to find the optimal parameters of the bijection mapping that leads to the most suitable virtual image for compression. The performance of the proposed compression algorithm was compared with those found using the separable approach and the traditional two-stage approach. In general, at very high compression rates, the bijection compression approach yields superior results, both perceptually and in the PSNR distortion measure.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

TABLE 1

Assuming a simple mathematical model for the spatial and spectral correlations, it is shown here that energy compaction can be increased by combining multispectral planes. While the model does not accurately model the correlations of multispectral imagery, it does indicate how the bijection map can improve compression. Consider a bispectral sensor measuring the reflectance of the same scene at two different frequencies. Assume that the received signals are stationary and have been sampled at the same rate. Let $f(n)=[f_1(n), f_2(n)]^T$ $n=1, \ldots N$, be the bispectral image where the one-dimensional spatial indexing variable "n" is used to denote pixel location for notational simplicity. For a given spectral location, the signal forms the vector $f_i=[f_i(1), f_i(2), \ldots, f_i(N)]^T$ for $i=1,2$. The spatial correlation matrices for each spectral signal is given by $$R_i = E(f_i f_i^T) = \begin{bmatrix} r_o+r & r & r & r \\ r & r_o+r & \cdots & r \\ r & r & \ddots & r \\ r & r & \cdots & r_o+r \end{bmatrix} \quad (13)$$

where a simple spatial correlation model is assumed for mathematical tractability. The correlation structure of the autocorrelation matrix may not be particularly accurate for multispectral imagery; however, the assumption of the more or less the same autocorrelation is a valid assumption as the multispectral images will be, more or less, similar. Since both $f_1$ and $f_2$ view the same scene, cross-spectral correlation between them exists. For mathematical tractability, assume that the cross-spectral correlation $C=E(f_1 f_2^T)$ is given by $$C = E(f_i f_i^T) = \begin{bmatrix} \rho_o & \rho & \cdots & \rho \\ \rho & & \cdots & \rho \\ & & \ddots & \\ \rho & \rho & \cdots & \rho_o \end{bmatrix} \quad (14)$$

where $\rho_0 > \rho$ is assumed. Again, the particular correlations may not be reasonable, but the cross-correlation structure is described exactly for this simple case $i=1,2$. Now, consider the two encoding strategies: (a) each signal is coded individually and (b) a virtual signal is formed by a bijection mapping followed by scalar encoding. For simplicity, the energy preserved in the reconstructed signals after encoding is used as a performance measure. Recall that a signal's energy is given by the sum of the eigenvalues of its correlation matrix. The eigenvalues of $R_i$, $i=1,2$, can be computed as:

$$\lambda_i = \begin{cases} r_o & i=1, 2, \ldots, N-1 \\ r_o + Nr & i=N. \end{cases} \quad (15)$$

Note that if each signal is individually compressed at a rate 1:N, the maximum energy preserved in each signal is given by the highest eigenvalue, namely, $\lambda_1 = r_0 + Nr$. Now, consider the case where both signals are mapped into one larger virtual signal, $g=[f_1^T, f_2^T]^T$. The correlation matrix of g is given by $$R_g = E(gg^T) = \begin{bmatrix} R_1 & C \\ C & R_1 \end{bmatrix}, \quad (5)$$

whose eigenvalues are $$\lambda_i = \begin{bmatrix} r_o + \rho - \rho_o & \text{for } i=1, \ldots, N-1 \\ r_o - \rho + \rho_o & \text{for } i=N, N_1, \ldots, 2N-2 \\ -(N-1)\rho + Nr + r_o - \rho_o & i=2N-1 \\ +(N-1)\rho + Nr + r_o + \rho_o & i=2N \end{bmatrix}.$$

For a compression rate of 1:N, the maximum energy preserved is determined by the two highest eigenvalues, namely:

Preserved Energy = (18)

$$\begin{cases} Nr + 2r_o + (N-2)\rho + 2\rho_o & \text{if } (N-2)\rho + 2\rho_o > Nr \\ 2Nr + 2r_o & \text{otherwise.} \end{cases}$$

From (4) and (7), the compression of the virtual image always provides higher energy preservation suggesting the potential the advantage of bijection mappings.

TABLE 2

The normalization factors given in Equation (6) are derived here. Let $f_k$ be k-th spectral component of a multispectral image. For notational simplicity, the pixel's spatial position index has been dropped. We want to normalize this component such that the resultant normalized component, denoted by $\tilde{f}_k$, has the same dynamic range than the other normalized components. Let $\bar{f}$ be the average of the different spectral components, that is $$\bar{f} = \frac{1}{L}\sum_{k=1}^{L} f_k,$$

Note that the average is performed for each spatial position $m=(m_1,m_2)$. We want to normalize $f_k$ with respect to $\bar{f}$, for $k=1,2\ldots L$, thus all the components have the same dynamic range. Define $\tilde{f}_k = \sigma_k f_k + \mu_k$, where $\sigma_k$ and $\mu_k$ are normalization factors to be optimally chosen. Since we are also interested in increasing the similarities between normalized components, $\sigma_k$ and $\mu_k$ are chosen to minimize the following cost function $$\min_{\sigma_k,\mu_k} E(\tilde{f}_k - \bar{f})^2 \qquad (19)$$

It can be easily shown that the values of $\sigma_k$ and $\mu_k$ that minimize the MSE between the k th normalized component and the spectral average image are given by:

$$\sigma_k = \frac{E(f_k \bar{f}) - E f_k E \bar{f}}{E f_k^2 - (E f_k)^2}$$

$$\mu_k = E\bar{f} - \sigma_k E f_k$$

The above equations can be rewritten as follows $$\sigma_k = \frac{\text{cov}(f_k, \bar{f})}{\text{var}(f_k)}$$

$$\mu_k = \bar{f} - \frac{\text{cov}(f_k, \bar{f})}{\text{var}(f_k)} \bar{f}_k$$

where cov(x,y), var(x) and $\bar{x}$ denote the covariance, variance and mean respectively.

What is claimed is:

1. A method for multispectral image compression comprising the steps of:
    sub-optimally mapping the multispectral image into a 2-dimensional array such that the most highly correlated points are near to one another, said sub-optimal mapping step including the steps of (1) selecting the pixels of the band that have the highest spatial correlation; (2) on each side of the pixel set, attaching the pixels corresponding to the band and that has the highest spectral correlation with respect to the band found in the previous step; (3) on each side of the resultant array, inserting the pixels corresponding to the band that has not been merged yet that has the highest spectral correlation with respect to the samples added in Step (2); and, (4) repeating the previous step up to all the bands that are multiplexed into a single band, such that the sub-optimal bijection mapping is to keep, as close as possible, those pixels that have a high correlation; and,
    then applying an image coding algorithm to said 2-dimensional array, whereby enhanced performance is achieved at high compression rates wherever cross-band correlation is high.

2. The method of multispectral image compression of claim 1 wherein the mapping of the multispectral image is a bijection mapping of the multispectral image.

3. The method of claim 2 wherein the original multispectral image is mapped onto a virtual 2-dimensional scalar image.

4. The method of claim 3 wherein the multispectral image is comprised of multispectral data including spatial correlation and spectral correlation and said spatial correlation and said spectral correlation are jointly exploited.

5. The method of claim 4 wherein the sub-optimal bijection mapping is optimized.

6. The method of claim 5 wherein distortion is minimized.

7. The method of claim 6 wherein there is a maximization of a function of second order statistics of the multispectral data.

8. The method of claim 1 wherein the image coding algorithm is a scalar image coding algorithm.

9. The method of claim 1 wherein there is no degradation of performance at low compression rates.

10. The method of claim 1 wherein there is a single 2-dimensional array.

11. A method of multispectral image compression comprising the steps of sub-optimally mapping by bijection mapping the multispectral image into a 2-dimensional array such that the most highly correlated points are near to one another.

12. The method of claim 11 wherein the original multispectral image is mapped into a virtual 2-dimensional scalar image.

13. The method of claim 12 wherein the multispectral image is comprised of
    multispectral data including spatial correlation and spectral correlation of said spatial correlation and spectral correlation are jointly exploited.

14. The method of claim 13 wherein the sub-optimal bijection mapping is optimized.

15. The method of claim 14 wherein distortion is minimized.

16. The method of claim 15 wherein there is a maximization of a function of second order statistics of the multispectral data.

17. The method of claim 11 wherein the image coding algorithm is a scalar image coding algorithm.

18. The method of claim 11 wherein there is no degradation of performance at low compression rates.

19. The method of claim 11 wherein there is a single 2-dimensional array.

20. A method for the compression of a multispectral image comprised of multispectral data, said method comprising the steps of:
    sub-optimally mapping by bijection mapping the multispectral image into a 2-dimensional array such that the most highly correlated points are near to one another and such that there is a maximization of a function of second order statistics of the multispectral data; and
    then applying an image coding algorithm to said 2-dimensional array, whereby enhanced performance is achieved at high compression rates whenever cross band correlation is high, but there is no degradation of performance at low compression rates.

* * * * *

UNITED STATES PATENT AND TRADEMARK OFFICE
CERTIFICATE OF CORRECTION

| | |
|---|---|
| PATENT NO. | : 7,224,845 B1 |
| APPLICATION NO. | : 10/376491 |
| DATED | : May 29, 2007 |
| INVENTOR(S) | : Leonard E. Russo et al. |

Page 1 of 1

It is certified that error appears in the above-identified patent and that said Letters Patent is hereby corrected as shown below:

On the title page, in section (73), please delete "BAE Systems Information and Electric Systems Integration Inc." and insert therefor --BAE Systems Information and Electronic Systems Integration Inc.--

Signed and Sealed this

Thirty-first Day of August, 2010

David J. Kappos
*Director of the United States Patent and Trademark Office*